United States Patent
Schnitta

(10) Patent No.: US 9,316,133 B2
(45) Date of Patent: Apr. 19, 2016

(54) PERFORATION ACOUSTIC MUFFLER ASSEMBLY AND METHOD OF REDUCING NOISE TRANSMISSION THROUGH OBJECTS

(71) Applicant: Bonnie S. Schnitta, East Hampton, NY (US)

(72) Inventor: Bonnie S. Schnitta, East Hampton, NY (US)

( * ) Notice: Subject to any disclaimer, the term of this patent is extended or adjusted under 35 U.S.C. 154(b) by 0 days.

(21) Appl. No.: 14/523,875

(22) Filed: Oct. 25, 2014

(65) Prior Publication Data

US 2015/0226098 A1 Aug. 13, 2015

Related U.S. Application Data

(63) Continuation-in-part of application No. 14/455,693, filed on Aug. 8, 2014, which is a continuation-in-part of application No. 11/017,642, filed on Dec. 22, 2004, now Pat. No. 8,827,033.

(60) Provisional application No. 61/895,841, filed on Oct. 25, 2013, provisional application No. 60/530,981, filed on Dec. 22, 2003.

(51) Int. Cl.

| | |
|---|---|
| *G10K 11/16* | (2006.01) |
| *E04B 9/02* | (2006.01) |
| *F01N 1/00* | (2006.01) |
| *B32B 5/02* | (2006.01) |
| *B32B 5/24* | (2006.01) |
| *B32B 7/02* | (2006.01) |
| *B32B 7/12* | (2006.01) |
| *E04B 9/00* | (2006.01) |

(Continued)

(52) U.S. Cl.
CPC . *F01N 1/00* (2013.01); *B32B 5/024* (2013.01); *B32B 5/24* (2013.01); *B32B 7/02* (2013.01); *B32B 7/12* (2013.01); *E04B 9/001* (2013.01); *G10K 11/16* (2013.01); *G10K 11/168* (2013.01); *B32B 2262/101* (2013.01); *B32B 2307/102* (2013.01); *B32B 2419/00* (2013.01); *E04B 2/7409* (2013.01); *E04B 2/7457* (2013.01)

(58) Field of Classification Search
CPC ..... E04B 2/7409; E04B 2/7457; E04B 9/001; G10K 11/16; G10K 11/168
USPC .......................... 181/198, 200, 205, 224, 225
See application file for complete search history.

(56) References Cited

U.S. PATENT DOCUMENTS 2,306,685 A * 12/1942 Chambers ............... E04B 9/001
  181/293
3,319,559 A * 5/1967 Raider .................. F24F 13/078
  181/224

(Continued)

*Primary Examiner* — Jeremy Luks
(74) *Attorney, Agent, or Firm* — John F. Vodopia

(57) ABSTRACT

A rugged noise muffler system is configured to substantially surround sound-emitting openings in a working unit or structure, to absorb sound emitted from the sound-emitting openings. A barrier component, formed as a housing, covers a sound emitting opening to inhibit sound from emanating from the housing, except at an open end of the housing. Each sound emitting opening in the working unit or structure requires a housing positioned over same. The housing includes a hood portion and an elongate portion that includes the open end of the housing. The inner surfaces of the hood portion and an elongate portion are lined with sound absorbing material. The emitted sound first enters the hood portion, is partially absorbed therein and any unabsorbed sound passes into and is substantially absorbed in the elongate portion as the sound travels towards the open end of the housing.

12 Claims, 15 Drawing Sheets

(51) Int. Cl.
*G10K 11/168* (2006.01)
*E04B 2/74* (2006.01)

(56) References Cited

U.S. PATENT DOCUMENTS

| | | | | |
|---|---|---|---|---|
| 3,820,627 | A * | 6/1974 | Wirt | B23Q 11/0046 181/225 |
| 3,860,085 | A * | 1/1975 | Gilbert | G10K 11/16 181/205 |
| 5,526,228 | A * | 6/1996 | Dickson | G06F 1/20 361/695 |
| 6,104,608 | A * | 8/2000 | Casinelli | F24F 13/24 181/224 |
| 7,314,113 | B2 * | 1/2008 | Doll | E04F 17/04 165/135 |
| 7,382,632 | B2 * | 6/2008 | Alo | G06F 1/18 361/816 |
| 7,549,505 | B1 * | 6/2009 | Kawar | G06F 1/18 181/202 |
| 7,644,803 | B2 * | 1/2010 | Hashizume | F04D 29/545 181/206 |
| 7,942,234 | B2 * | 5/2011 | Utsunomiya | G03B 21/16 181/214 |
| 7,980,357 | B2 * | 7/2011 | Edwards | F01D 25/30 181/264 |
| 2004/0200664 | A1 * | 10/2004 | Monson | E04F 17/04 181/224 |
| 2008/0259616 | A1 * | 10/2008 | Morgan | E04B 9/001 362/404 |
| 2010/0116583 | A1 * | 5/2010 | Seedorf | F04B 53/002 181/205 |
| 2011/0259666 | A1 * | 10/2011 | Quasney | E04B 9/0428 181/224 |
| 2012/0024623 | A1 * | 2/2012 | Tange | F02M 35/1266 181/224 |

* cited by examiner

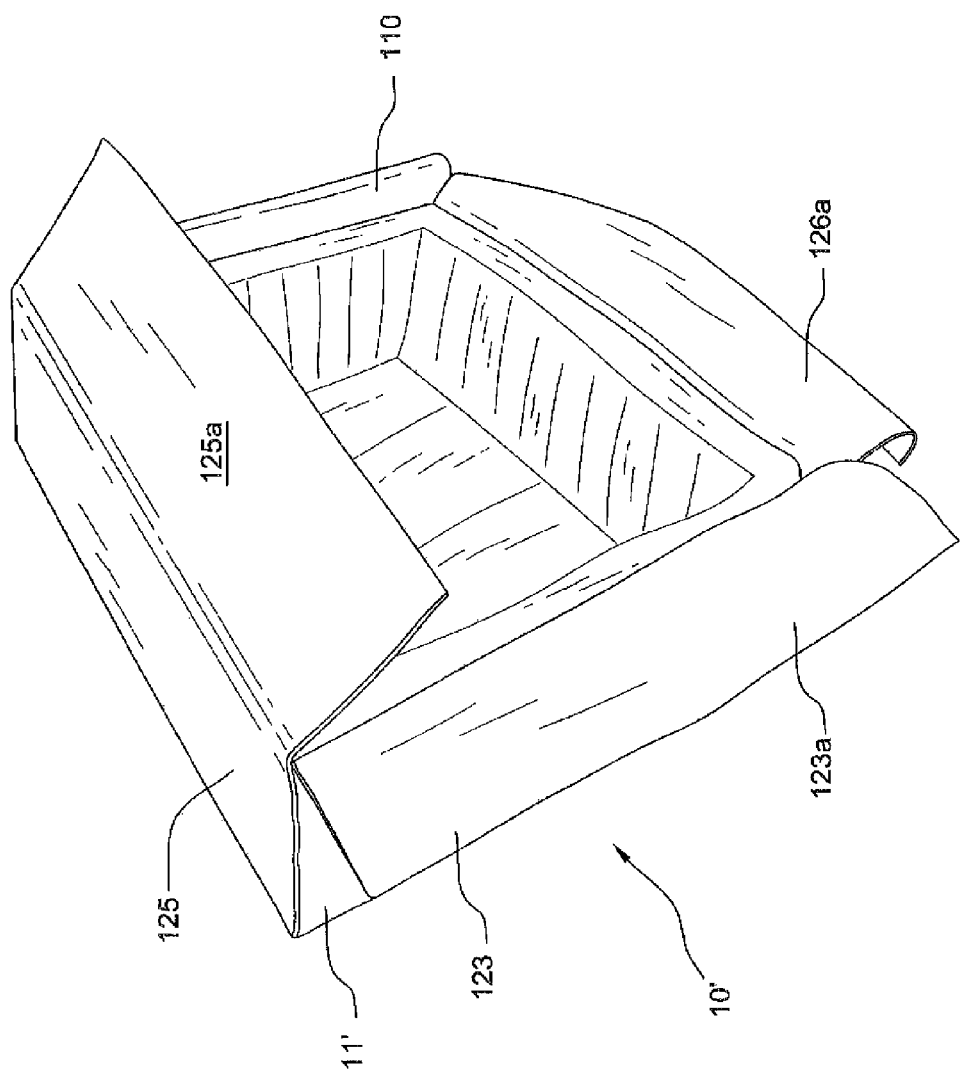

PERFORATION ACOUSTIC MUFFLER ASSEMBLY AND METHOD OF REDUCING NOISE TRANSMISSION THROUGH OBJECTS

CROSS-REFERENCE TO RELATED APPLICATIONS

This application is a continuation-in-part (CIP) application based upon U.S. patent application Ser. No. 14/455,693, filed on Aug. 8, 2014 and upon U.S. Provisional Patent Application Ser. No. 61/895,841, filed on Oct. 25, 2013; U.S. patent application Ser. No. 14/455,693 is a continuation-in-part (CIP) application based upon U.S. patent application Ser. No. 11/017,642, filed on Dec. 22, 2004 ('642 application), which '642 application is based upon and derives the benefit of the filing date of U.S. Provisional Patent Application No. 60/530,981, filed Dec. 22, 2003; the contents of U.S. patent application Ser. No. 14/455,693, U.S. Provisional Patent Application Ser. No. 61/895,841, U.S. patent application Ser. No. 11/017,642 and U.S. Provisional Patent Application No. 60/530,981 are incorporated herein by reference.

BACKGROUND OF THE INVENTION

The present invention relates to a system for attenuating noise. In particular, the present invention relates to a system for attenuating noise that may be emitted from a room through a hole or opening. Additionally, the invention can attenuate noise when the opening houses any low STC object that cannot be completely enclosed, such as a recessed light fixture. The present invention further relates to a methodology for attenuating noise from a room that contains at least one hole or opening for receiving a low STC object that cannot be completely enclosed, such as a recessed light fixture or other mechanism.

Hearing noises such as for example, footsteps, speech, music or environmental sounds from adjacent rooms, upper floors, pipes, outside the dwelling or adjacent dwellings is something that many people experience on a daily basis. At a minimum, it can be distracting. Many spend large sums of money to reduce the overall transmission of sound into and/or through their dwellings in order to create quieter surroundings. Various sound insulating techniques exist to significantly reduce and/or limit the transmission of sound through the walls, ceilings and other objects contained in today's commercial and residential buildings. A great deal of attention is paid to the configuration of the walls, floors and ceilings and the materials forming the same to provide for high transmission loss, which minimizes the transmission of noise from one room or space to another.

The ability of the configuration with its specified materials to reduce or prevent sound passing through the configuration is denoted by its STC. STC stands for "sound transmission class" and is a single number rating derived from measured values of sound transmission loss in accordance with the American Society for Testing and Materials (ASTM) E90 standards. The transmission loss through an object is a measure of its effectiveness in preventing the sound power incident on one side of the object from being transmitted through it and radiated on the other side. The STC provides a single number estimate of an object's performance for certain common sound reduction applications.

Typically, ceilings and walls have openings and/or holes formed therein to receive various devices including electrical outlets, air ducts, lighting, speakers, etc. While the walls, floors and ceilings can be adequately insulated to limit noise transmission, these openings have an adverse impact on the transmission loss. As such, noise can enter the room or space through the opening and the device mounted therein.

SUMMARY OF THE INVENTION

In response to the foregoing challenges, applicant has developed an innovative noise attenuation system for use in a structure having a hole for some type of mechanism, such as a recessed light fixture mounted therein, which cannot be addressed with a complete acoustic enclosure, due to required air flow for heat dissipation, or a needed opening, such as when a large quantity of wires is required. The noise attenuation system is constructed to permit the absorption of noise emitted into the structure from the mechanism such that the transmission loss of the structure is not adversely impacted by the presence of the opening and the mechanism located therein. The noise attenuation system is also constructed to permit dissipation of heat from the mechanism, if required.

The noise attenuation includes a noise absorbing muffler positioned over the hole through which the noise is being emitted. The noise absorbing muffler includes an outer high STC barrier layer that limits the passage of sound waves emitted from the mechanism therethrough. The noise absorbing muffler further includes a noise absorbing layer positioned adjacent to the outer barrier layer. The noise absorbing layer absorbs a predetermined amount of sounds waves emitted from the mechanism. An optional third layer can be secured to the barrier layer, which would be a noise decoupling layer. This is most commonly used when low frequency noise may need to be decoupled from the structure. A fourth optional layer can be secured to the outer most layer that is a protective shell. This is most commonly used when the muffler needs to be protected from such items as vandalism.

Applicant has also developed an innovative method for attenuating noise emitted from a recessed light fixture mounted in an opening in a structure. The method includes determining the minimum length of a noise attenuating muffler based upon a predetermined wavelength of a sound wave. Once the proper length of muffler is determined, the noise attenuating muffler is located within the structure in an area surrounding the mechanism. The noise attenuating muffler substantially absorbs the sound waves emitted into structure from the recessed fixture. Thus, when the sound exits the muffler the reduction in noise is equal to the transmission loss that would have occurred had there never been a hole.

In another embodiment, the invention provides a noise muffler configured to substantially surround a sound generating object, disposed in or to be disposed in, a structure including a wall or ceiling to be sound limited by, and attenuate sound emitted from the sound generating object, the wall or ceiling including a board having an exposed surface and an opposite surface.

The noise muffler comprises front, rear, left and right sides and a bottom connected to each of the front, rear, left and right sides to form a muffler cavity defining an inner volume. The sound generating object is positioned in the muffler cavity. The front, rear, left and right sides, and the bottom of the muffler are formed with an outer barrier layer. At least one of the front, rear, left, right sides and bottom of the muffler are formed with a noise absorbing layer positioned adjacent the outer barrier layer to absorb a predetermined amount of sound emitted from the object. At least one of the front, rear, left and right sides includes a first opening into the inner volume of the muffler cavity, wherein a size of the opening is adjustable.

Each of the front, rear, left and right sides are bordered by top, bottom, left and right ends, and wherein the left and right ends of each side is connected to the right and left ends of sides positioned to the left and right, respectively. The bottom is bordered with front, rear, left and rights ends, wherein each of the ends is connected to bottom ends of the front, rear, left and right sides to form the muffler cavity. A first primary flap is attached to and extending from an end of at least one of the front, rear, left, right sides of the muffler opposite the end attached to the bottom. The first opening in the at least one side is arranged proximate the first primary flap. A first secondary flap is arranged in the muffler proximate the first opening, opposite the first primary flap, and wherein a physical distance separating the first primary flap and the first secondary flap defines a size of the first opening.

The first secondary flap includes a first end and a second end and wherein a first extension member extends from the second end, substantially in parallel with the at least one side, for part of the extent of the at least one side between the top and bottom ends thereof, forming a first channel in fluid communication with the first opening. The first channel is in fluid communication with the volume of the muffler cavity. The first opening and the first channel together act as a baffle.

A second primary flap is attached to and extending from an end of another of the front, rear, left, right sides, which opposes the at least one side of the muffler, opposite the end attached to the bottom. A second opening is included in the another side arranged proximate the second primary flap. A second secondary flap is arranged in the muffler proximate the second opening, opposite the second primary flap, and wherein a physical distance separating the second primary flap and the second secondary flap defines a size of the opening. The second secondary flap includes a first and end a second end and wherein a second extension member extends from the second end, substantially in parallel with the another side, for part of the extent of the another side between the top and bottom ends thereof, forming a second channel in fluid communication with the second opening. The second channel is in fluid communication with the volume of the muffler cavity. The first and second openings are in fluid communication with each other through the first and second channels and inner volume of the muffler cavity. Preferably, the size of the opening is adjustable by adjusting a position of the first primary flap.

In another embodiment, the invention provides a rugged noise muffler system is configured to substantially surround one or more sound-emitting openings in a working unit or structure, to absorb sound emitted from the sound-emitting openings in order that sound detected at the working unit or structure does not exceed a predetermined level. The system includes a barrier formed as a housing to cover a sound emitting opening of the working unit or structure to inhibit sound from emanating from the housing, except at an open end of the housing. Each sound emitting opening in the working unit or structure requires a housing positioned over same. The housing includes a hood portion and an elongate portion that includes the open end of the housing. The inner surfaces of the hood portion and an elongate portion are lined with sound absorbing material. The sound emitted from the sound emitting opening first enters the hood portion and is partially absorbed therein. Any unabsorbed sound from the hood portion passes into and is substantially absorbed in the elongate portion as the sound travels towards the open end of the housing.

At least one of the hood portion and the elongate portion is open to the ground and the elongate portion includes the housing open end to facilitate gaseous intake or gaseous exhaust carried out by the working unit or structure through the sound emitting opening. The length of the hood portion, the elongate portion or both is defined in consideration of the frequency of the sound emitted from the sound emitting opening. The length of the hood portion, the elongate portion or both is defined in consideration of the loudness of the sound emitted from the sound emitting opening. Preferably, however, the length of the hood portion, the elongate portion or both is defined in consideration of the STC and NRC of the sound absorbing material, the thickness of the sound barrier/absorbing acoustic rated material or both.

In another embodiment, the invention provides a rugged muffler system configured to substantially surround one or more sound-emitting openings in a working unit or structure, to absorb sound emitted from the sound-emitting openings in order that sound detected at the working unit or structure does not exceed a predetermined level. At least one barrier formed as a housing to cover a sound emitting opening of the working unit or structure to inhibit sound from emanating from the housing, except at a first barrier opening. The housing is elongate and includes first end second opposing housing ends and is constructed to withstand compressive forces. The first barrier opening is positioned at one of the first and second housing ends to facilitate a free exchange of gases. The housing has a predefined length from the sound emitting opening in the working unit or structure to the first barrier opening. Inner surfaces of the housing are lined with at least one layer of sound absorbing material to absorb the sound emitted from the sound emitting opening as the sound travels the length of the barrier.

The housing is preferably made of metal, but may be made of hard plastic or polyvinyl chloride. In an alternative form, the housing has a height of 8 or less inches from the ground and, where necessary, a second barrier opening for free exchange of gases at the other one of the first and second housing ends. The housing may be configured without a bottom housing part and, for positioning on the ground or other base surface. Both the ground or other base surface and the sound attenuating material act to absorb sound emitted from the sound emitting opening of the working unit or structure before same reaches one of the first and second barrier openings. Two, three, four, five . . . housings may be included, where necessary, for positioning to cover and prevent sound from emanating from two, three, four, five . . . sound emitting openings.

BRIEF DESCRIPTION OF THE DRAWINGS

The invention will be described in conjunction with the following drawings in which like reference numerals designate like elements and wherein:

FIG. 7A is a perspective view of another embodiment of the noise attenuation system of the invention, comprising a noise muffler for substantially completely surrounding and attenuating noise associated with a mechanism;

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
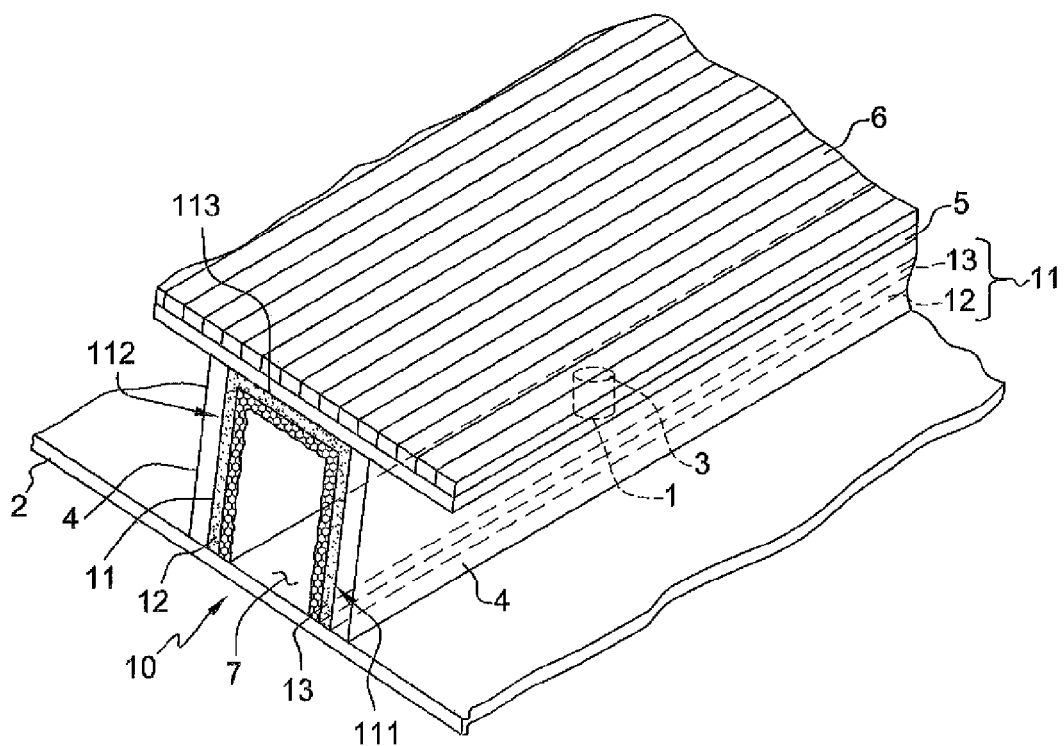
FIG. 1 is a perspective view illustrating the noise attenuation system in accordance with an embodiment of the present invention whereby the noise attenuation system is positioned between upper and lower floors.
Figure 2:
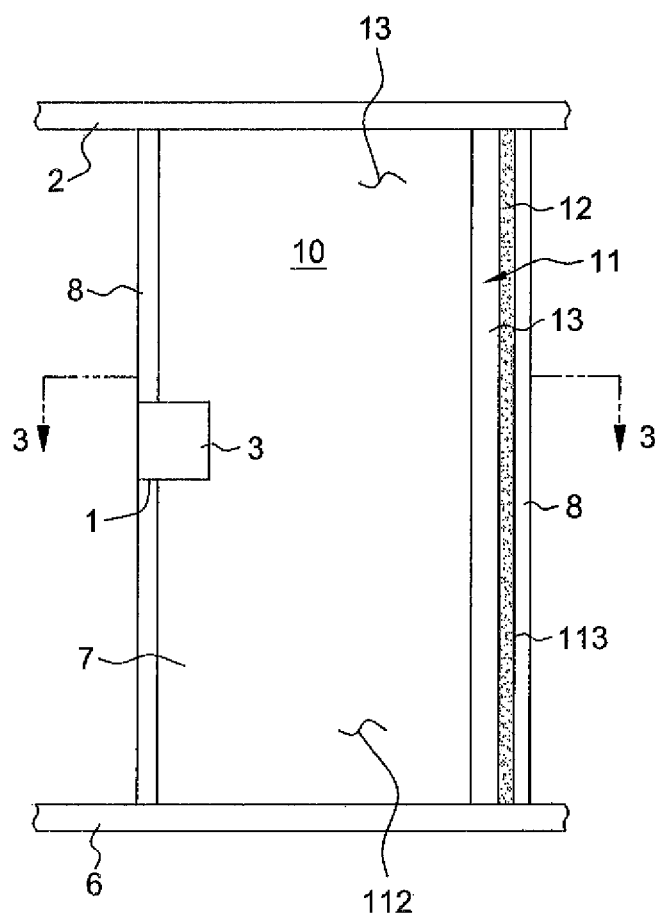
FIG. 2 is a partial side cross-sectional view of the noise attenuation system in accordance with the present invention positioned between adjoining walls.
Figure 3:
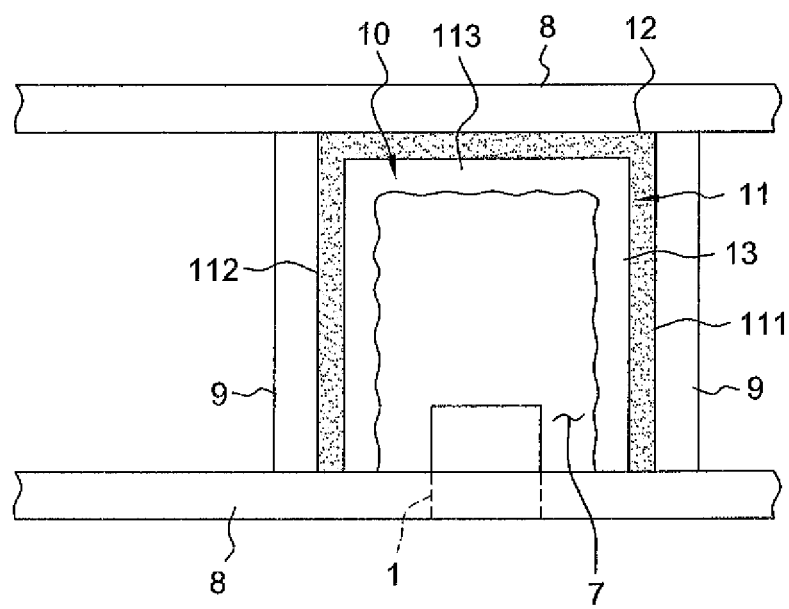
FIG. 3 is a cross-sectional view of the noise attenuation system taken along the 3-3 line in FIG. 2.

A system 10 for attenuating noise will now be described in greater detail in connection with FIGS. 1-4. For purpose of illustration, the system 10 for attenuating noise will be described in connection with the attenuation of noise associated with an opening 1 formed in a ceiling 2 for receipt of a mechanism 3, as illustrated in FIG. 1. The noise attenuation system 10 can also be used to attenuate noise associated with an opening formed in a wall 8, as shown in FIGS. 2 and 3. In accordance with the present invention, the mechanism 3 can be a recessed light fixture or any component that is recessed in a wall or ceiling including but not limited to electric outlet boxes, speakers, intercoms, exhaust fans, electrical heaters, video equipment including cameras and monitors and the like. Typically, the mechanism 3 is positioned between a pair of joists 4 or wall studs 9. The joists 4 or studs 9 can be located between walls 8, as shown in FIGS. 2 and 3, or between the ceiling 2 and the subfloor 5, as shown in FIG. 1. The mechanism 3 can be mounted to one or both of the joists 4. It is also contemplated that the mechanism 3 can be solely supported by the ceiling 2, wall 8 or by a bracket (not shown) connected to one or more of the joists 4, the studs 9, wall 8 or the subfloor 5. The ceiling 2 of the room or space is attached to the lower side of joists 4. The subfloor 5 of the upper floor of an upper room is attached to the upper side of the joists 4. A flooring material 6 is then secured to the subfloor 5. In a wall installation, the walls 8 are connected to the sides of the studs 9.

In order to improve the transmission loss of noise between the ceiling 2 and the subfloor 5 and flooring material 6 or the walls 8, the noise attenuating system 10 includes a noise muffler 11 that is located in the area 7 surrounding, but usually not contacting the mechanism 3, as shown in FIGS. 1-3. The noise muffler 11 includes an outer barrier layer 12. The barrier layer 12 can be formed from a material, with a high STC barrier. The barrier layer 12 can be formed of a loaded vinyl (e.g., a one pound per square foot loaded vinyl). The barrier layer 12 can be formed from a material having an STC rating that is equal to or greater than the STC rating of the wall 8, floor 5, 6 or ceiling 2 when measured without the opening 1. Additionally, the material forming the barrier layer 12 can be a non-rigid material such that the layer 12 can be molded, shaped or manipulated to conform to the joists 4 and subfloor 5 or wall 8 in the vicinity of area 7. A more rigid form of the material can also be used when providing noise attenuation in an area having predetermined dimensions. The barrier layer 12 has a suitable STC rating such that any noise emitted from the mechanism 3 in the area substantially remains in the area 7 while the sound waves travel within the muffler 11.

Figure 5:
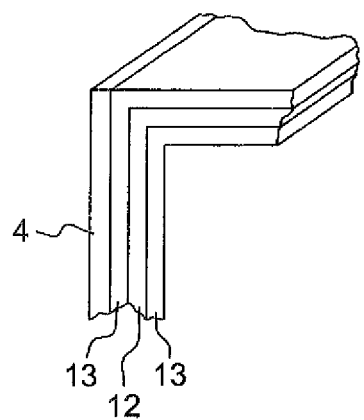
FIG. 5 is a partial perspective view illustrating a variation of the noise attenuation system in accordance with the present invention.

The noise muffler 11 further includes a noise absorbing layer 13, which is attached to or lines at least one side of the barrier layer 12, as shown in FIGS. 1 and 2. As shown in FIG. 5, the noise muffler 11 can include a pair of noise absorbing layers 13, which are located on opposing sides of the barrier layer 12. The second noise absorbing layer can function as a decoupler for potential low frequency noises. The sound waves emitted from the mechanism 3 are absorbed by the noise absorbing layer 13 before it exits the muffler 11. With such a construction, a suitable transmission loss is achieved. The noise absorbing layer 13 is preferably a high NRC rated material, where "NRC" stands for noise reduction coefficient and represents the average amount of sound absorbed by the material. The NRC rating typically ranges from 0.01 to 1.0. NRC ratings above 1 (e.g., 1.03) are also possible. The higher the NRC rating, the greater the sound absorption. The noise absorbing layer 13 is chosen based upon the characteristics of the particular mechanism 3.

Various materials are contemplated. In particular, the material forming the layer 13 is chosen for its sound absorbing qualities and its ability to withstand any heat emitted from the mechanism 3. As such, the material forming layer 13 for noise attenuation of a recessed stereo speaker can differ from the material used for noise attenuation of a recessed lighting fixture 3. Fiberglass and glass wool are considered to be suitable materials for the noise absorbing layer 13 for their sound absorbing and fire resistant qualities. The layer 13 may also be formed from a closely woven textile-like material formed from any suitable material provided the material has suitable sound absorbing properties and withstands a predetermined temperature. Additionally, it is preferable that the noise absorbing layer 13 be formed from a class A fire rated material. A suitable adhesive can be used to secure the noise absorbing layer 13 to the barrier layer 12. When multiple noise absorbing layers 13 are provided (e.g., FIG. 5), the layers can be formed from either the same material or a different material. Alternatively, the noise absorbing layer 13 can be connected to the barrier layer 12 when the layers 12 and 13 are secured to the joists 4 or subfloor 5 using suitable fasteners (not shown).

In the case of the stereo speaker, it is not necessary that the layer 13 withstand higher temperatures; rather, it is important that the material have high noise or sound absorption qualities to absorb the noise emitted into the area 7 by the speaker that may be transmitted through the joists 4 and the subfloor 5 and floor 6 into adjacent spaces. The barrier layer 12 will attenuate the noise that may be transmitted through the floor into the space above through the joists 4 and the ceiling 2, while the noise absorbing layer 13 will absorb noise emitted into the area 7 by the speaker. Furthermore, it is important that the material does not adversely affect the acoustic wave of the speaker for the desired sound to be emitted into the space.

In contrast, the material for the layer 13 used in connection with a recessed lighting fixture must be able to withstand higher temperatures emitted from the mechanism 3. The noise absorbing qualities of the material in this application are not as important because the barrier layer 12 will provide the primary noise attenuation. The muffler 11 can be sized to permit the dissipation of heat from the recessed fixture, if required.

As shown in FIGS. 1-3, the noise muffler 11 preferably includes sides 111 and 112, which extend along the joists 4 adjoining the area 7. An upper portion 113 is positioned adjacent the subfloor 5 (FIG. 1) or wall 8 (FIG. 3). The noise muffler 11 is preferably formed with open ends to permit venting. The noise muffler 11 can also include ends, not shown, when heat venting is not required such as for speaker enclosures and electric outlets, which extend between the joists 4 from the subfloors 5 to the ceiling. The ends, however, are not necessary if the length of the muffler is long enough, because the noise absorbing layer 13 substantially absorbs the sound waves before the sound waves can exit the ends of the muffler 11. The muffler 11 can provide a noise absorbing barrier having an STC rating that is equal to or greater than the ceiling and surrounding structure or wall and surrounding structure depending on the placement of the mechanism 3. As an example, the muffler 11 would travel from the ceiling up the joist 4 along the subfloor 5 above and down the other joist 4 to the ceiling 2 attached to the adjacent joist 4. As shown in FIG. 1, the muffler 11 surrounds the mechanism 3. The muffler 11 is intended to contain the noise generated from the mechanism 3 and/or transmitted through the walls, ceilings, joists, studs and floors of adjacent spaces thus creating a situation where the energy of the acoustic wave is forced to travel through the muffler 11. The muffler 11 is sized such that as the sound waves travel within the muffler 11, the sound waves are substantially absorbed by the layer 13 such that the noise is absorbed by the layer 13 before exiting the muffler 11.

The size of the muffler 11 may vary according to the particular noise attenuation application. The size of the muffler 11 is determined based upon several parameters including, but not limited to the heat generated from the mechanism 3 such that proper ventilation can be provided, the frequency of the noise to be contained by the muffler 11, the amount of transmission loss required, and the material used to form the layer 13. The number of fixtures 3 placed in a particular area will also impact the size of the muffler 11. For example, the number of recessed lights which may be located in a linear arrangement such that they are positioned between the same two joists 4 will impact the size of the muffler 11. The muffler 11 may be sized to extend the length of the joists 4 such that a single muffler 11 is provided for noise attenuation and proper ventilation.

Whatever the absorbing material chosen for the layer 13, it will attenuate the acoustic energy of the noise source (i.e., the fixture 13). Since absorbers have a known noise absorption in a specific frequency, the length of the muffler 11 is to be governed by the frequency of concern and the material used. The length is determined such that the noise emitted from the mechanism 3 is substantially absorbed by the muffler 11 before exiting the muffler 11. Any remaining sound waves are absorbed or reduced by the surrounding structure (i.e., ceilings 2, wall 8 and joists 4 and any sound insulating materials located therein. As such, the STC rating of the structure containing the opening 1 with the mechanism 3 can be substantially the same as the structure without the opening 1 and the mechanism 3. The length of the noise muffler 11 can be determined based upon a determination of the wavelength $\lambda$ of the noise. The wavelength $\lambda$ is determined based upon the velocity of the sound waves $v_w$ and the frequency f of the noise where:

$$\lambda = v_w / f$$

Figure 4:
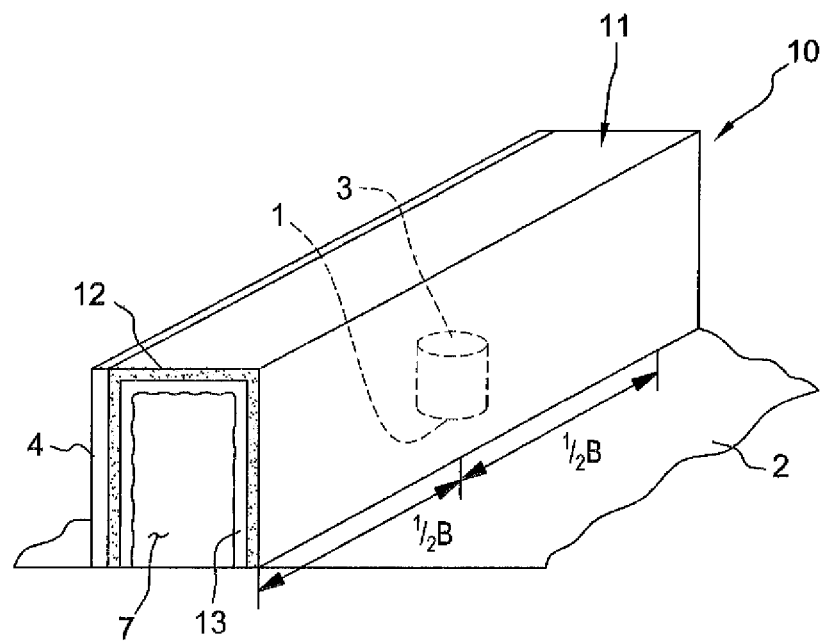
FIG. 4 is a perspective view illustrating the length of the noise attenuation system in accordance with the present invention.

As shown in FIG. 4, the minimum length of the muffler 11 is .beta. where:

$$\beta = 2\lambda / NRC$$

The NRC rating is chosen based upon the material forming layer 13 at a given frequency f.

EXAMPLE 1

The frequency f of concern is 500 Hz. The velocity of the sound wave $v_w$ is 1100 ft./sec. Using this information, the approximate desired length of the muffler 11 can be determined.

$$\lambda = (1100 \text{ ft./sec})/500 \text{ Hz} = 2.2 \text{ ft.}$$

The NRC coefficient for a material for using in absorbing sound waves with a frequency f of 500 Hz is 0.85.

$$\beta = 2\lambda / NRC = 2(2.2 \text{ ft})/0.85 = 5.2 \text{ ft.}$$

The minimum length of the muffler 11 is approximately 5.2 ft. with the mechanism 3 being located approximately in the center of the muffler 11 (i.e., ½β as shown in FIG. 4). This determined minimum length of the muffler 11 will provide adequate noise attenuation whereby the sound waves will be absorbed prior to exiting the muffler 11 and can provide sufficient space to permit ventilation of the mechanism 3 and dissipation of any heat emitted from the mechanism 3.

EXAMPLE 2

The frequency f of concern is 125 Hz. The velocity of the sound wave $v_w$ is 1000 ft./sec. Using this information, the approximate length of the muffler 11 can be determined.

$$\lambda = (1100 \text{ ft./sec})/125 \text{ Hz} = 8.8 \text{ ft.}$$

The NRC coefficient for a material for using in absorbing sound waves with a frequency f of 125 Hz is 0.65.

$$\beta = 2\lambda / NRC = 2(8.8 \text{ ft})/0.65 = 27 \text{ ft.}$$

The minimum length of the muffler 11 is approximately 27 ft. with the mechanism 3 being located approximately in the center of the muffler 11 (i.e., ½β as shown in FIG. 4). This determined length of the muffler 11 will provide adequate noise attenuation whereby the sound waves will be absorbed prior to exiting the muffler 11 and can provide sufficient space to permit ventilation of the mechanism 3 and dissipation of any heat emitted from the mechanism 3.

It is intended that the noise attenuation system 10 in accordance with the present invention may be installed during the construction phase of the structure or as a retrofit after construction, but during the installation of the fixtures 3 during for example a home or office remodeling. The installation of the system 10 during a retrofit or remodel may require the removal of a least a portion of the wall or ceiling 2 to permit insertion of the muffler 3.

Additionally, any insulation located between the joists 4 would also have to be removed in the area surrounding the mechanism 3, if heat ventilation is required.

While the above-described embodiments show system 10 are described in connection with the attenuation of noise associated with an opening 1 formed in a ceiling 2 or wall 8 for receipt of a mechanism 3 (FIG. 1-5), FIGS. 6A, 6B and 7A-7C depict a noise attenuation system 10' that comprising a muffler 11' that is not required (but may be) directly mounted in a wall or ceiling. Noise muffler instead constructed to receive a mechanism 3 in an open cavity 110 formed with 5 sides (bottom 122, front end 123, rear end 124, left side 125 and right side 126), where at least one of the front and rear ends 123, 124 or, the left and right sides 125, 126 is partially open. The size of the opening (or openings where both sides or ends are partially open) is adjustable in an amount required by the nature of the mechanism 3 to be surrounded thereby.

The overall size of the muffler 11' may vary according to the size of the particular mechanism 3 for which it is to substantially enclose, as well as the heat generated from the mechanism 3. For that matter, each of the front end 123, rear end 124, left side 125 and right side 126 include respective flaps 123a, 124a, 125a and 126a, attached and extending along the side ends opposing the side ends that connect to the 4 bottom ends. The flaps 123a, 124a, 125a and 126a pivot, due to the flexibility of their nature, and the flexibility of their connection to the respective sides, almost 360° in order that they may be aligned in parallel with the sides, either inside or outside of the cavity 110. The muffler 11', therefor, operates like a pouch (a preferably rectangular pouch), with flaps. The flaps may be used to secure the muffler to a structure to which the mechanism is affixed, or to the structure itself, for example, by nailing, stapling, gluing, etc., without limitation.

Figure 6A:
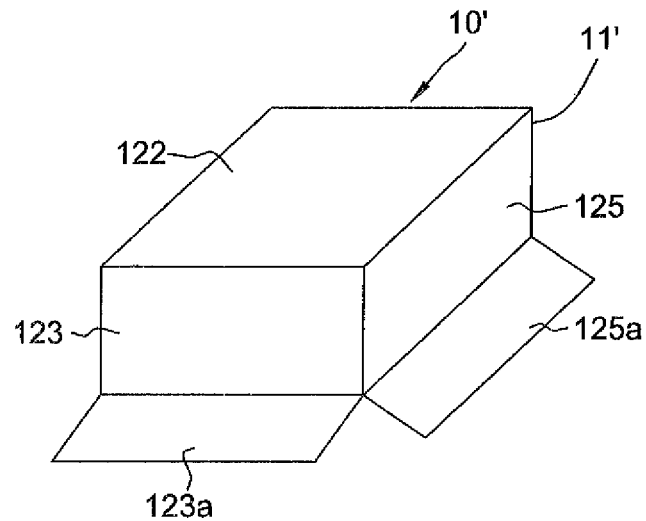
FIG. 6A is a schematic diagram depicting a side perspective view of the noise muffler of the invention.
Figure 6B:
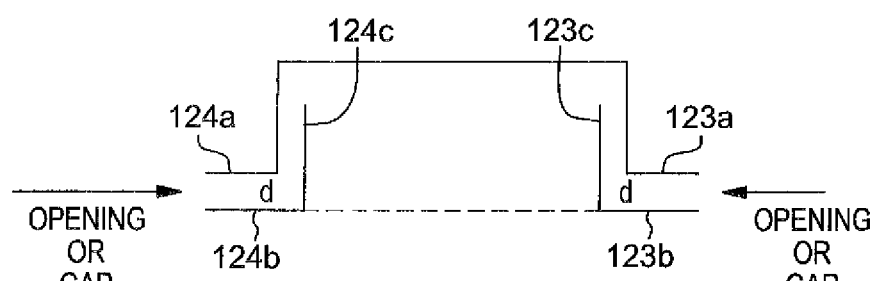
FIG. 6B is a schematic diagram depicting side cross-sectional view of the noise muffler of FIG. 6A.
Figure 7B:
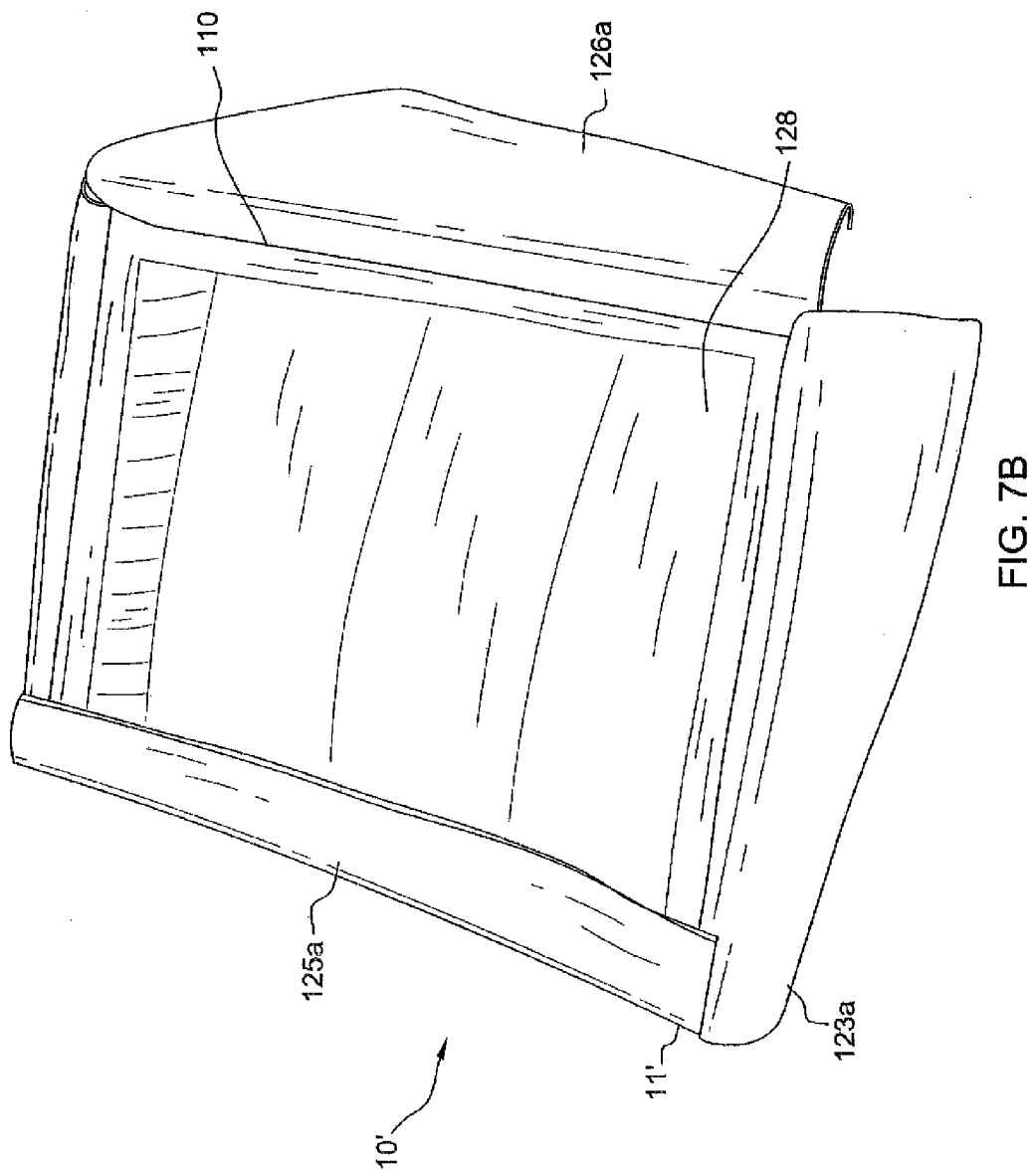
FIG. 7B is a top plan view looking into a cavity formed by the noise muffler construction of FIG. 7A.
Figure 7C:
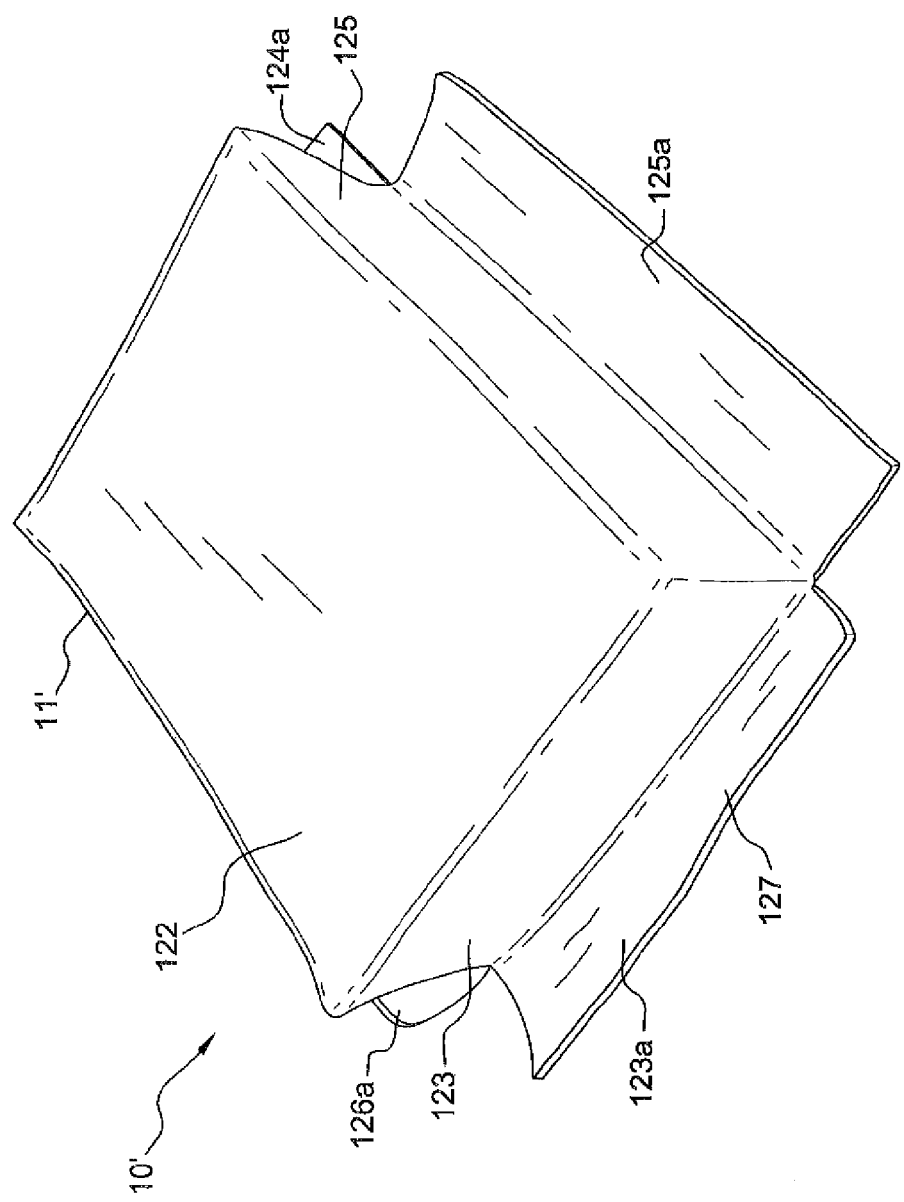
FIG. 7C is a bottom perspective view of the noise muffler of FIGS. 7A and 7B.

At least one of the front and rear ends 123, 124, or the left and right sides 125, 126 of the muffler 11' include an opening, the size of which is adjustable. FIG. 6B shows one exemplary embodiment where the opening is provided in rear end 124. The opening is created by including a second flap 124b separated from the first flap 124 a by a gap, the second flap 124b arranged to extend horizontally (in FIG. 6B to highlight the gap or partial opening) to a second inner side wall 124c, between the inner surface of the rear end 124 and the inner volume of the cavity 110. The gap or partial opening between the inner surface of the rear end 124 and the inner volume of the cavity 110 extends to an opening into the inner volume of the cavity 110 (near the inner surface of bottom 122), essentially forming a "baffled" path for air flow, wires, etc., from outside the muffler 11' to the inner volume of the cavity 110 and of course the mechanism substantially enclosed or to be substantially enclose therein.

By adjusting the positioning of the first flap 124 and the second flap 124a, and/or the length of the height or the rear end 124, the size of the opening or gap is adjustable. For example, where the mechanism 3 is a loud speaker, the size of the gap or opening may be minimal, as only minimal heat builds up in the inner volume of the muffler 11' during intended use. However, if the mechanism is a light or other mechanism that generates a fair amount of heat in normal use, the gap or opening must be substantially larger, in worst case circumstance being an entirely open end. Likewise, the opposing or front end 123 may include a second flap 123b and inner wall 123c, that enable adjust the size of an opening or gap at the other end. The reader should note that the gaps or openings are not limited to being provided in the front end, the rear end or both, but me be positioned in additionally or replacedly in at least one or both of the left 125 and right 126 sides, without deviating from the scope and spirit of the invention.

In order to improve the transmission loss of noise generated by a mechanism inside the cavity 110, all 5 sides (bottom 122, front end 123, rear end 124, left side 125 and right side 126) of the noise muffler 11' include an outer barrier layer 127. The outer barrier layer 127 can be formed from a material, with a high STC barrier, for example, formed of a loaded vinyl (e.g., a one pound per square foot loaded vinyl). Additionally, the material forming the barrier layer 127 can be a non-rigid material such that the layer 127 can be molded, shaped or manipulated to conform to any location at which the mechanism is to be or is positioned. A more rigid form of the material can also be used when providing noise attenuation in an area having predetermined dimensions.

The noise muffler 11' further includes a noise absorbing layer 13, which is attached to or lines at least one (but preferably all 5) sides (bottom 122, front end 123, rear end 124, left side 125 and right side 126) of the muffler 11'. For that matter, while not expressly shown in FIGS. 6A, 6B, &A, 7B and 7C, the noise muffler 11' can include a pair of noise absorbing layers 13, which are located on opposing sides of the barrier layer 12. The second noise absorbing layer can function as a decoupler for potential low frequency noises. The sound waves emitted from the mechanism 3 are absorbed by the noise absorbing layer 13 before it exits the muffler 11'. With such a construction, a suitable transmission loss is achieved. The noise absorbing layer 13 is preferably a high NRC rated material, where "NRC" stands for noise reduction coefficient and represents the average amount of sound absorbed by the material. The noise absorbing layer 13 is chosen based upon the characteristics of the particular mechanism 3.

Various materials are contemplated. In particular, the material forming the layer 13 is chosen for its sound absorbing qualities and its ability to withstand any heat emitted from the mechanism 3. As such, the material forming layer 13 for noise attenuation of a recessed stereo speaker can differ from the material used for noise attenuation of a recessed lighting fixture 3. Fiberglass and glass wool are considered to be suitable materials for the noise absorbing layer 13 for their sound absorbing and fire resistant qualities. The layer 13 may also be formed from a closely woven textile-like material formed from any suitable material provided the material has suitable sound absorbing properties and withstands a predetermined temperature.

Additionally, it is preferable that the noise absorbing layer 13 be formed from a class A fire rated material. A suitable adhesive or a fastener that is secured in way as to include a sealant or a piece of hardware designed to create a seal, such as a fender washer, can be used to secure the noise absorbing layer 13 to the barrier layer 12. When multiple noise absorbing layers 13 are provided, the layers can be formed from either the same material or a different material. In the case of the stereo speaker, it is not necessary that the layer 13 withstand higher temperatures; rather, it is important that the material have high noise or sound absorption qualities to absorb the noise emitted by the speaker. The barrier layer 12 will attenuate the noise that may be transmitted from the back of the speaker (or other mechanism), while the noise absorbing layer 13 will absorb noise emitted by the speaker. Furthermore, it is important that the material does not adversely affect the acoustic wave of the speaker for the desired sound to be emitted into the space.

In contrast, the material for the layer 13 used in connection with a recessed lighting fixture must be able to withstand higher temperatures emitted from the mechanism 3. The noise absorbing qualities of the material in this application are not as important because the barrier layer 12 will provide the primary noise attenuation. The muffler 11 can be sized to permit the dissipation of heat from the recessed fixture, if required.

It will be appreciated that numerous modifications to and departures from the preferred embodiments described above will occur to those having skill in the art. The present invention is not intended to be limited to sound insulation between the floor and ceiling of a structure, rather, the system 10 can be used between walls or in any structure where sound insulation is desired.

Furthermore, the terminology fixture is not intended to be limited to recessed lighting; rather, the terminology fixture may include any component that may be mounted in a recess or hole in a wall, ceiling or other structure. Furthermore, the muffler 11 can be used in any application where it is desirable to increase transmission loss through the recessed fixture and/or provided ventilation of the recessed fixture to permit dissipation of heat from the recessed fixture when necessary, or just an opening for such items as extensive wiring. It is also contemplated that the noise absorbing layer 13 can be formed from one or more layers which together form the layer 13. Thus, it is intended that the present invention covers the modifications and variations of the invention, provided they come within the scope of the appended claims and their equivalents.

The invention also provides a rugged noise attenuating system for use in protecting and attenuating sound emitted from structures or units that have at least one noise emitting portion, or opening exposed to the environment (i.e., the outdoors). Such structures are typically positioned on the ground or include a portion with a sound emitting source rising out of the ground or ground enclosure, for example, a housing associated with a cellular tower, vents, exhausts, access points, etc., for mechanical equipment installed in residential and commercial buildings, installed in or below in parking lots, proximate highways, bridges, unused land in close proximity to populated areas, etc.

The sources of emitted sound to be attenuated by the rugged noise attenuating system generally embody an opening in the structure for air intake or exhaust, where noise escapes with the exhaust and/or intake into the environment. As some blowers, compressors, etc. are quite loud, the rugged noise attenuation system is configured to envelop and cover the structure or portion with the opening, protecting the fixture, unit, mechanism or portion while attenuating the sound (i.e., noise) that might normally be released into the environment.

Inventive embodiments, therefore, embody a rugged noise attenuation or muffler system including one or multiple noise absorbing mufflers constructed according to the details set forth hereinbelow. The one or multiple noise absorbing mufflers are then positioned upon a structure or unit, or to enclose the structure or unit to attenuate noise emanating therefrom, and preferably, constructed to protect the structure physically from any damage that could occur by contact from cars, trucks, etc.

Figure 8:
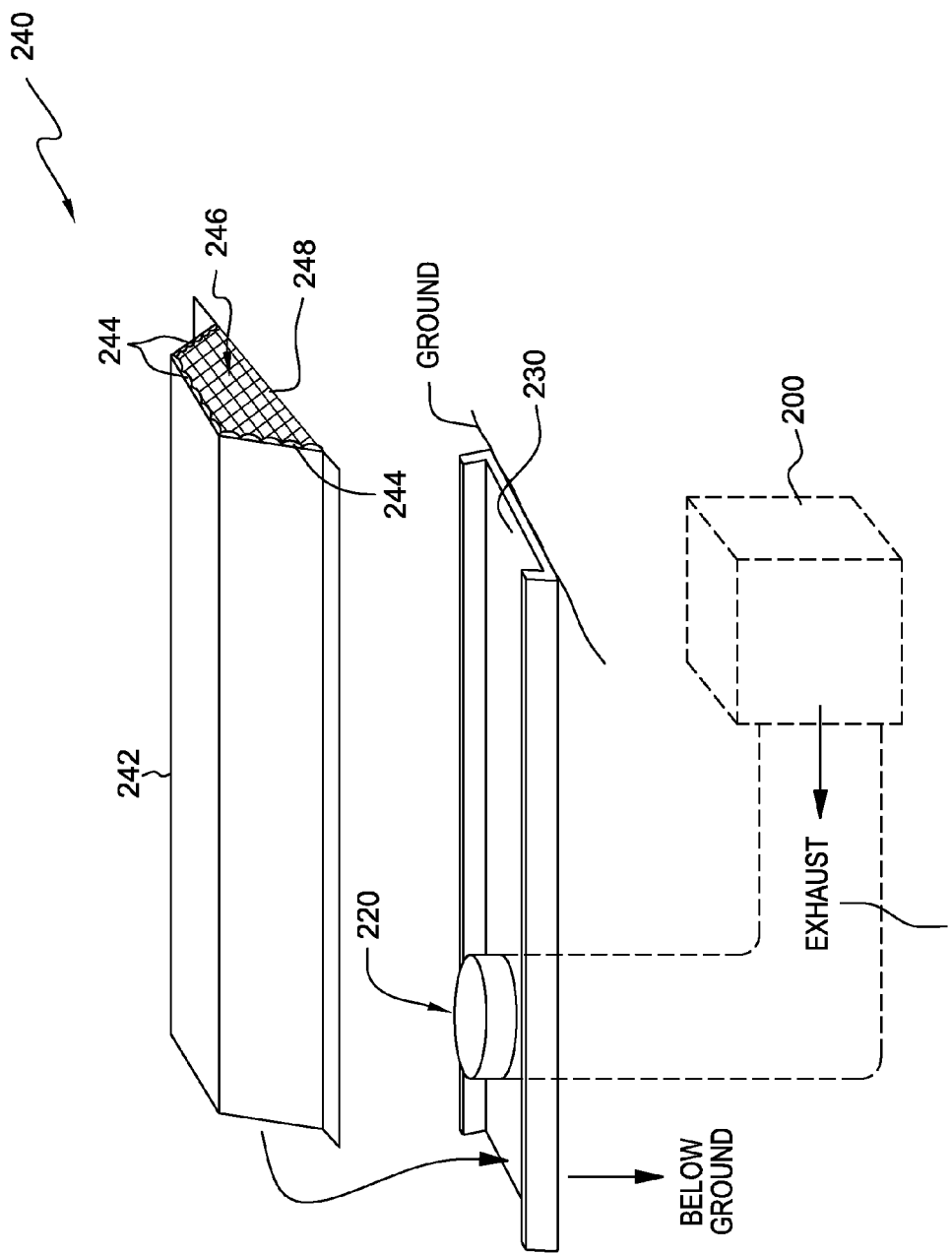
FIG. 8 depicts an embodiment of a rugged noise muffler system proximate an opening in an underground unit from which emitted noise is attenuated.

FIG. 8 depicts an underground unit 200 (e.g., a condenser, blower, etc.), from which extends an exhaust duct(s) 210 (also underground) that operates as an channel to an above-ground opening or vent, covered by a collar 220 to prevent water, etc., from entering the duct(s). Such an arrangement typically includes a concrete slab 230 at ground level, through which the duct extends to the collar and under which the underground unit 200 is positioned, but not always. A rugged muffler system 240 of the invention is disposed on the concrete slab 230 in order to cover and insulate the collar 220 from the environment, to suppress noise emanating from the unit 200, particularly at collar 220, and protecting the unit and/or the collar 220 from damage that could result from accidental or intentional mechanical forces applied thereon. For that matter, the rugged muffler system 240 may be used to cover not only an exhaust opening, such as that covered by collar 240, but intake openings and emergency exhaust and/or intake openings, realizing a multicomponent rugged muffler system. The barrier 242 as shown is substantially trapezoidal shaped, with side flanges extending away from the sides where same contacts the ground, as shown.

The rugged muffler system 240 comprises a barrier 242 that is preferably metal, such as steel, and lined on at least one inside surface with sound insulating or absorbing material 244 (seen on the side of the barrier). A large portion of the sound emanating from the vent or collar 220 will come into contact with an inner surface of the barrier 242, and the sound absorbing material 244. The sound is prevented from passing from inside a volume that is substantially enclosed by the barrier, through the barrier wall, to outside the volume. Parts of the sound that are not absorbed directly by the sound absorbing material travel laterally towards the single opening 246 (as shown in FIG. 8), where portions if not all are absorbed by contact with further sound absorbing material and the ground (or slab).

The noise absorbing layer may formed from a class A fire rated material. A suitable adhesive or a fastener that is secured in way as to include a sealant or a piece of hardware designed to create a seal, such as a fender washer, can be used to secure the noise absorbing layer to the barrier. In a variation, the barrier might include multiple noise absorbing layers, which can be formed from either the same material or a different material.

In a preferred embodiment, the sound absorbing material 244 is QB12 sound insulating material. QB12 is an absorber/barrier composite comprising sound absorbing/barrier composite acoustic rated material made available as a commercial product by SoundSense, Wainscott, N.Y. The STC of the absorber identified as sound absorbing/barrier material 244 (as well as the length of the channel through which the sound to be absorbed is forced to traverse) must be determined for any particular application in view of the length of the barrier 242 and/or the distance from the sound source to the rugged muffler opening or openings.

Please note that while the perspective view of FIG. 8 only shows a small part of the inside of the barrier 242, including the sound absorbing or attenuating material, the material fully lined the entire vertical and horizontal inside surfaces. Typically a lower or bottom barrier surface is not required to effectively protect the units and structures, because, as mentioned above, the ground or even a concrete slab is a good sink for sound energy. That is, the ground operates to absorb sound energy that strikes it in its tortuous path from the sound emitting opening in a unit to be protected to a barrier opening (246). But where a barrier bottom surface is included for a particular application, particularly in a case where the barrier is formed of a hard material such as metal, plastic, polyvinyl chloride (PVC), etc., such bottom is reflective wherefore an absorber needs to be added or attached to the inner bottom surface.

Figure 9:
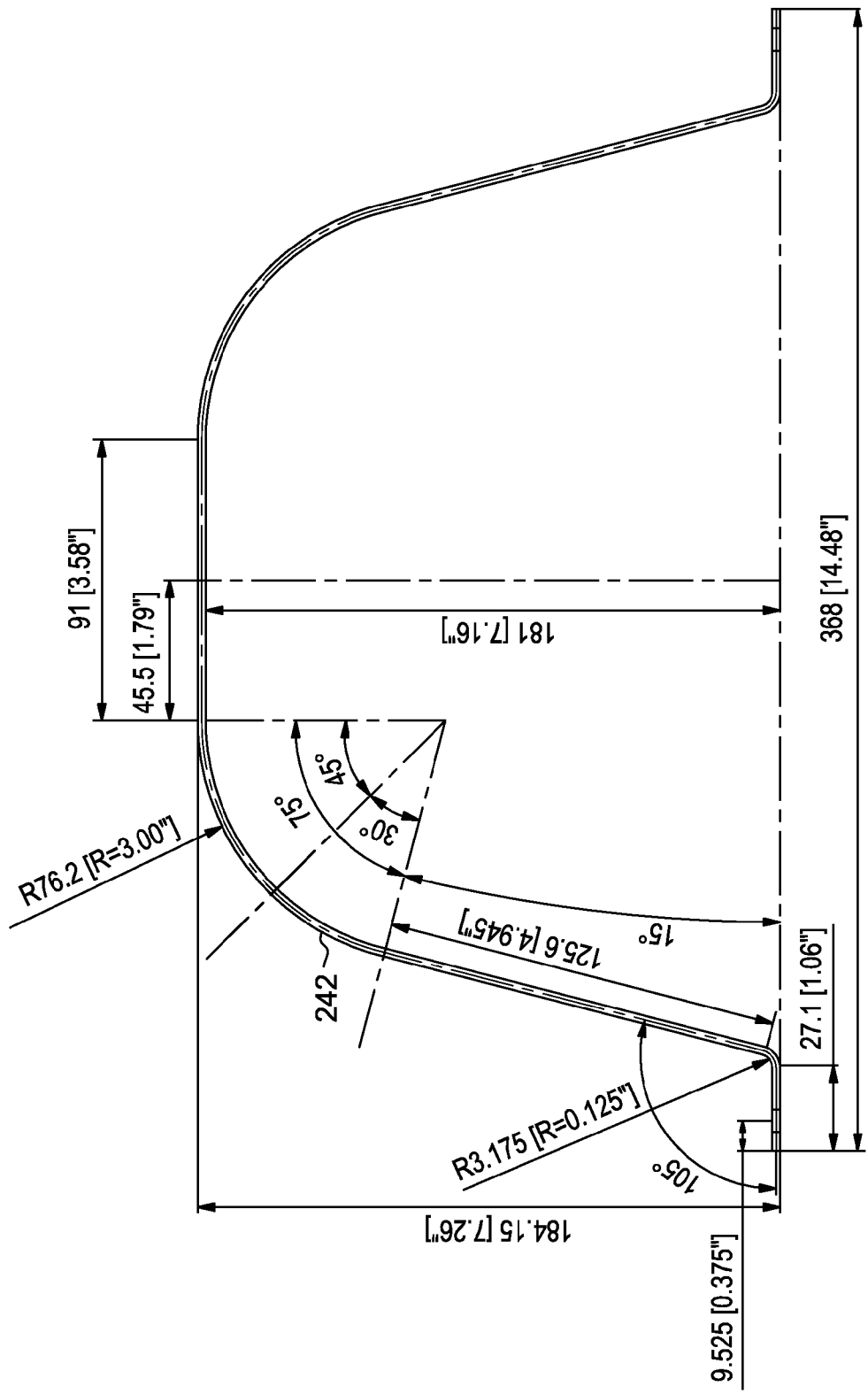
FIG. 9 presents a side view of embodiment of the rugged noise muffler system of FIG. 8.

Preferably, a screen 248 is included in the opening 246, to keep small animals, insects and/or other debris out of the volume substantially surrounded by the barrier. FIG. 9 presents a side cross-sectional view of one embodiment of the barrier 242, which is made of metal or fiberglass (depending on need), including dimensions, but without sound absorbing material 244. While the barrier system 242 is depicted as including only one opening (on the right side of FIG. 8), a second opening may be included to better facilitate gas exchange, where necessary.

Figure 10:
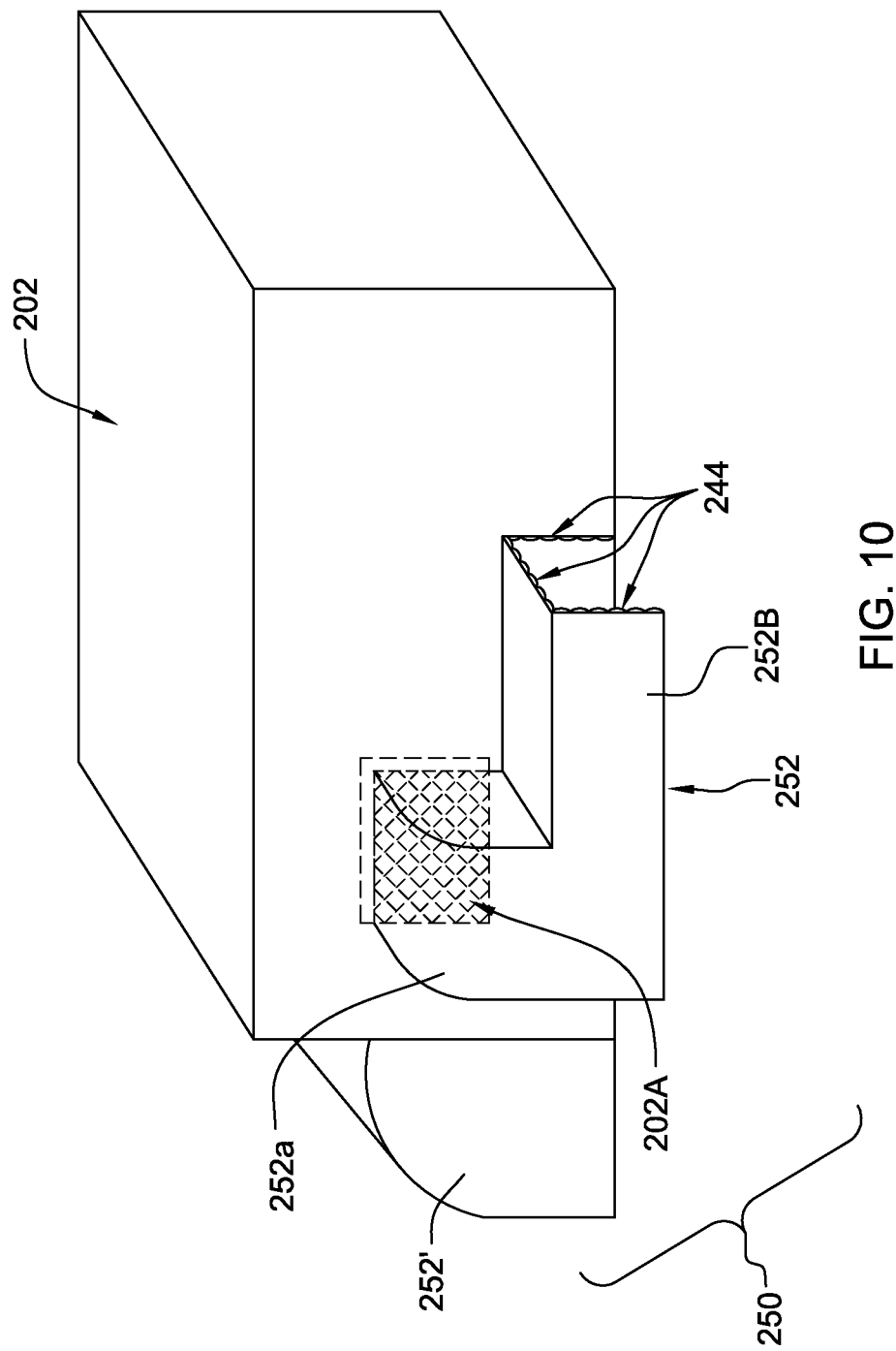
FIG. 10 presents an embodiment of the rugged noise muffler system proximate an above ground unit that includes at least two exhaust and/or intake openings that emit noise that is attenuated by the system.

In some applications, units to be protected by the rugged muffler system are substantially above ground structures, or partially above ground, and have more than one opening that functions as a source of unwanted sound. FIG. 10 presents an example of an above ground unit 202 that includes at least two exhaust and/or intake openings 202a and 202b, where only opening 202a is clearly seen in the figure and, an alternative rugged muffler system 250 provided to sound insulate noise emanating from above-ground unit 202.

Figure 11A:
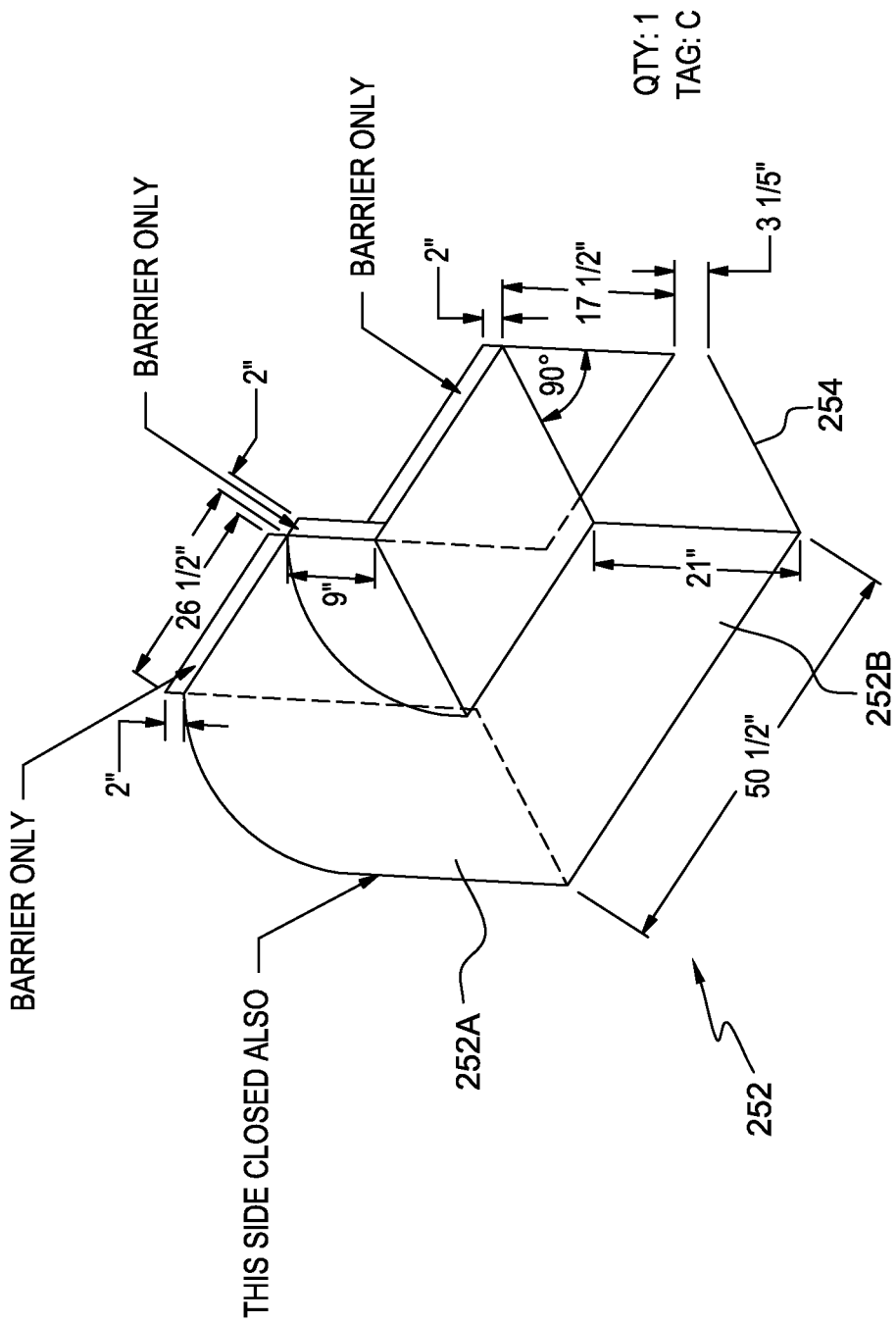
FIG. 11A depicts a barrier component of the system, which comprises a first hood portion and an elongate portion.
Figure 11B:
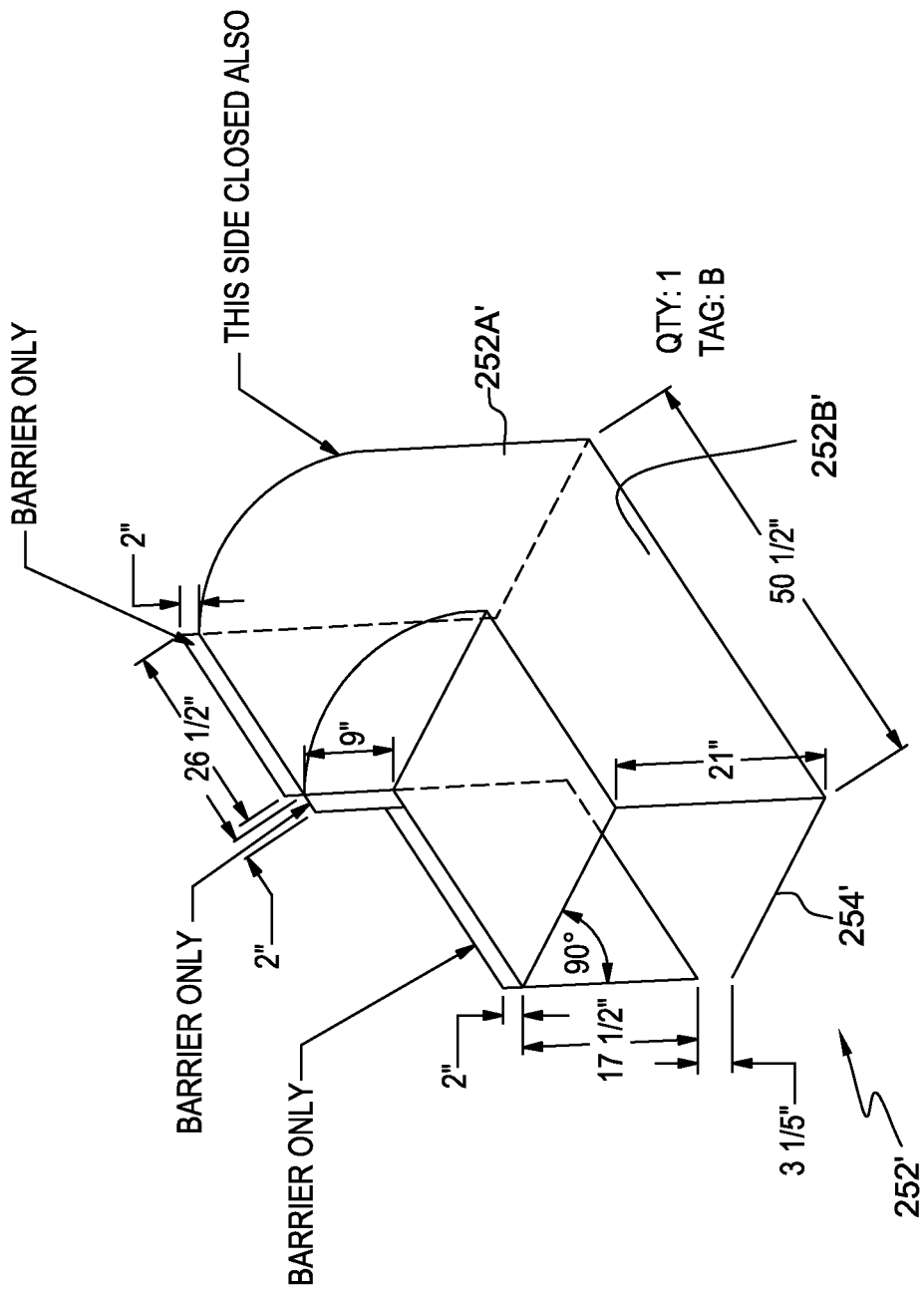
FIG. 11B depicts a barrier component of the system that is structurally a mirror image of the component shown in FIG. 11A.

Rugged muffler system 250, as shown, comprises two separate barrier components, a first barrier component 252 and a second barrier component 252'. These first and second barrier components (or barriers) are shown in detail in the manufacturer drawings of FIGS. 11A and 11B, respectively. That is, the first barrier component 252 comprises two contiguous portions, a hood portion 252A, and an elongate portion 252A. The second barrier component 252' is a mirror image of the first barrier component 252 (partially obscured in FIG. 10 but clearly shown in FIG. 11b). Both the first and second barrier components 252, 252' include sound absorbing material 244 on at least one (and preferably all) of their inside surfaces and are open at the bottom. But please note that like the embodiment of FIGS. 8 and 9, a bottom surface may be included in certain applications, which is covered with sound absorbing material. Sound emanating from openings 202a and/or 202b of mechanical unit 202 comes into contact with the inner, noise-absorbing-material-lined surfaces of the hood portions 252A, 252A', respectively, and prevented from passing through the barrier. Part of the noise is absorbed in the hood portions, including by both the sound absorbing material and the ground thereunder.

Sound that is not absorbed in the hood portions 252A, 252A', then travels laterally away from the hood portions within the elongate portions 252B, 252B'. Any unabsorbed sound/noise leaving the hood portions is further attenuated by the sound absorbing material 244 and ground under the respective elongate portions, as it moves towards the openings. While designed with a length determined in view of the expected sound intensity, the lowest frequency of the unwanted sound and the STC of the sound absorbing material, little or no sound should be detected at the openings 254, 254'.

Figure 11C:
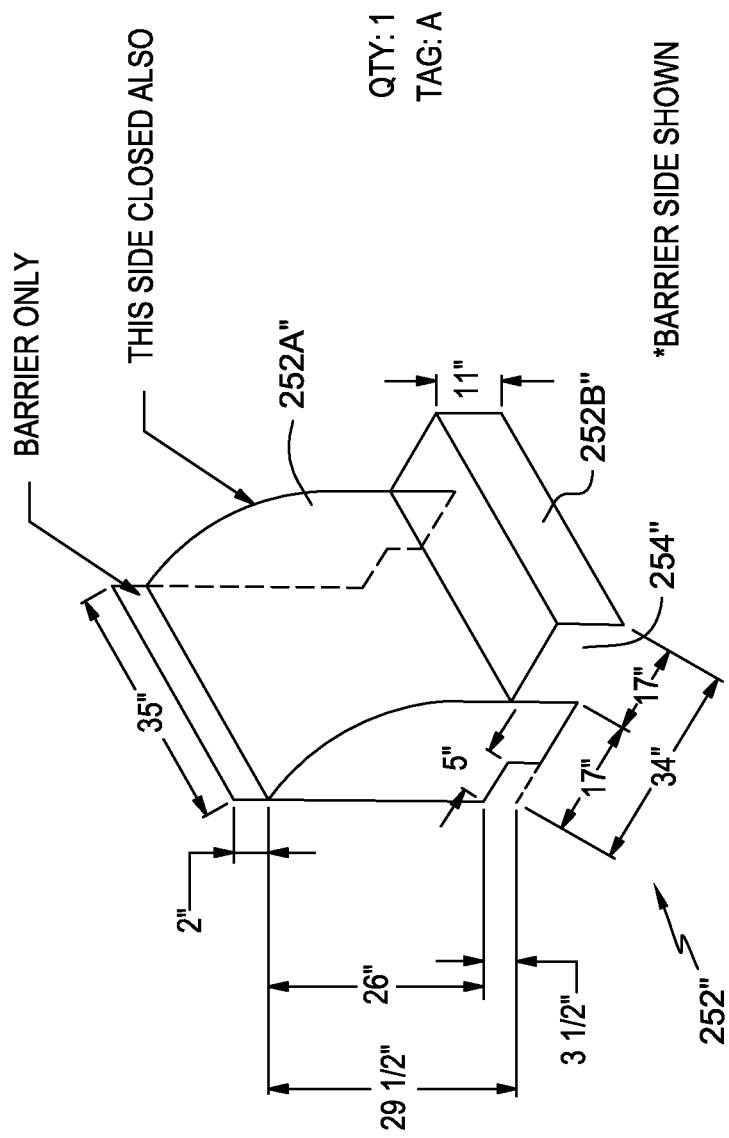
FIG. 11C depicts an alternative barrier component of the inventive system.

It should be noted that the physical shape and number of the muffler or barrier components may be varied as long as the final defined shape (particularly, the length), and the STC of the sound absorbing material 244 therein, to effectively reduce the sound radiating from the noise source openings in the unit 202. For that matter, FIG. 11C presents a manufacturing drawing of an alternative embodiment of a barrier or muffler portion 252" (including dimensions for one implementation), where the elongate component 252B" is formed as a quasi-step part of hood portion 252A" and extends contiguously therefrom. An exhaust opening 254" is shown close to the ground, at which gases are freely exchanged but where little or no noise should escape.

The opening 254" can be provided on the other side of the elongate portion 252B", depending on the location of the noise emitting source (not shown) relative the left or right side sides of the hood portion 252A". That is, it is preferable to maximize the distance the sound must travel from a source to an opening 254, 254', 254". The longer the distance, the more opportunity for the sound to be absorbed by the sound absorbing material and the ground (or ground structure). For that matter, while shown with only one opening 254, 254', 254", a second opening might be included opposite a first as required. While not shown in FIGS. 11A, 11B and 11C, the inside surface of each of the barrier structures are covered with an absorbing/barrier acoustic rated material, such as that of QB12.

In order to ensure that the barrier or barriers that are part of a rugged muffler system will effectively insulate sound from the unit or units to be protected, several steps are required. First, the lowest frequency sound that will radiate from the source(s) of sound (i.e., unit opening(s)), must be determined. This can be accomplished by use, for example, of a Larson Davis System precision sound level meter and a real-time frequency analyzer.

Then, the length of the barrier component (e.g., both the hood part and/or the elongate part 252B, 252B', 252B") that covers the sound emitting source, prevents the sound from passing through the barrier to the outside and absorbs the sound, must be determined, in view of the lowest anticipated frequency of the sound. Once the length is determined, the STC and NRC of the sound barrier/absorbing material sufficient to reduce the measured sound to the desired or acceptable sound level is determined. Once the material with the required STC and NRC rating is determined, the absorber material is applied to and affixed on all inside surfaces of each muffler or barrier component. As mentioned, where there is no bottom or ground-contacting surfaces, any sound waves striking the ground covered by the hood portion 252A and elongate portion 252B are attenuated at least in part; the non-absorbed part is reflected back or away.

Figure 12:
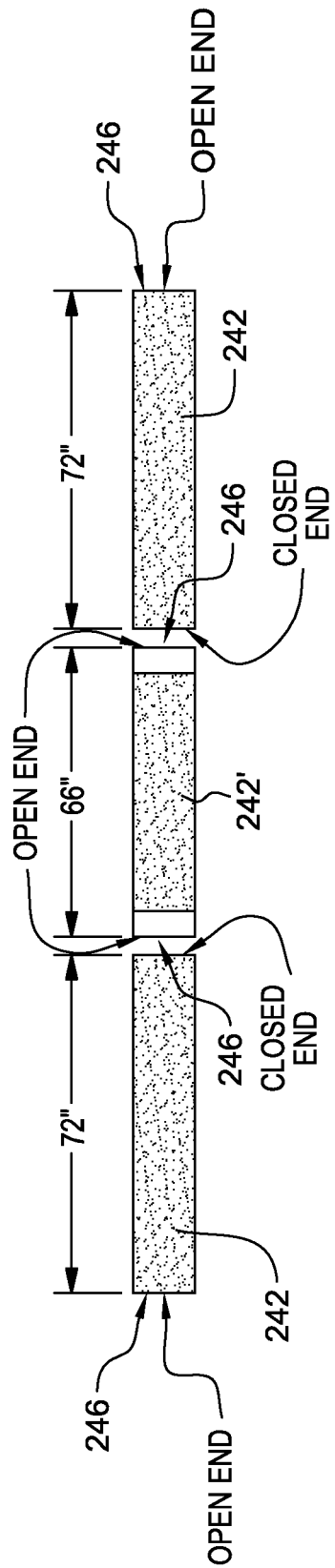
FIG. 12 depicts a side view of one embodiment of the inventive system comprising three components for attenuating noise emanating from an intake cover, a small exhaust cover and an exhaust cover of a unit.

In one application, the inventive rugged muffler system is used to quiet noise from a structure found at cellular tower equipment locations. That is, cellular towers typically have a structure(s) or unit for housing electronics and other required mechanical equipment utilized at the cell tower locations, for example, that must be cooled. In many cases, such housings have three sound producing openings, e.g., an air intake opening, an exhaust opening and an emergency air release opening. A rugged muffler system to accommodate such a structure, therefore, must have three components or portions constructed and installed to cover and attenuate to reduce or eradicate sound that would normally be emitted from the three openings FIG. 12 presents a side view of a rugged muffler system that comprises three muffler or barrier components, a first component 242, a second component 242' and a third component 242 (left to right in the figure), installed to cover an intake opening cover, a small exhaust (i.e., emergency) opening cover and an exhaust opening cover (not shown expressly in the figure). The first barrier or component 242 has an open end 246 (at the left in the figure) and an opposing closed end. The second barrier or component 242' also has an open end 246 proximate the closed end of first barrier or component 242. The other end of the second harder or component 242, also is open, as shown. The third harrier or component 242 which is a mirror image of the first component or barrier, has a closed end proximate the open end of the second barrier 242' and an open end 246, in the right in FIG. 12. The openings facilitate free exchange of gases with the sound emitting openings of the covers but because of their respective distances therefrom are likely to emit little or no sound, which is absorbed by the sound absorbing material and on the inside surfaces thereof.

These barrier or muffler components as shown are functionally and structurally equivalent to the muffler system/component 242, depicted in FIG. 8. The length dimensions shown are calculated in consideration of the loudness and power of the measured sound, as well as the STC of the sound absorbing material (not shown in FIG. 12) emitted from each respective three openings (i.e., an air intake opening, an exhaust openings and an emergency air release opening). The three muffler or barrier components 242, 242', 242 (left to right in the figure) are 72 inches, 66 inches and 72 inches, respectively. The barrier components as shown also are approximately 15 inches wide and 7 or 8 inches.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A rugged noise muffler system configured to substantially surround one or more sound-emitting openings in a working unit or structure, to absorb sound emitted from the sound-emitting openings in order that sound detected at the working unit or structure does not exceed a predetermined level, the system comprising:
    at least one barrier formed as a housing to cover a sound emitting opening of the working unit or structure to inhibit sound from emanating from the housing, except at an open end of the housing, when sound is emitted from the working unit or structure;
    wherein the housing includes a hood portion attached to or integral with the housing that receives the sound emitted from the working unit or structure;
    wherein the housing further includes an elongate portion attached to or integral with the hood portion and which includes the housing open end;
    wherein inner surfaces of the hood portion and an elongate portion are lined with sound absorbing material;
    wherein the sound emitted from the sound emitting opening first enters the hood portion travels a first distance and is partially absorbed therein;
    wherein unabsorbed sound from the hood portion passes into and travels a second distance through the elongate portion and is substantially absorbed therein; and
    wherein a sound transmission class (STC) of the sound absorbing material lining the hood portion and the elongate portion, and a total distance of the first and the second distance determines a level of the sound emitted at the housing open end.

2. The rugged noise muffler system of claim 1, wherein at least one of the hood portion and the elongate portion is open to the ground.

3. The rugged noise muffler system of claim 1, wherein the elongate portion includes the housing open end to facilitate gaseous intake or gaseous exhaust carried out by the working unit or structure through the sound emitting opening.

4. The rugged noise muffler system of claim 3, wherein the length of the hood portion, the elongate portion or both is defined in consideration of the frequency of the sound emitted from the sound emitting opening.

5. The rugged noise muffler system of claim 3, wherein the length of the hood portion, the elongate portion or both is defined in consideration of the loudness of the sound emitted from the sound emitting opening.

6. The rugged noise muffler system of claim 3, wherein the length of the hood portion, the elongate portion or both is defined in consideration of the STC and NRC of the sound absorbing material, the thickness of the sound barrier/absorbing acoustic rated material or both.

7. A rugged noise muffler system configured to substantially surround one or more sound-emitting openings in a working unit or structure, to absorb sound emitted from the sound-emitting openings in order that sound detected at the working unit or structure does not exceed a predetermined level, the system comprising:
    at least one barrier formed as a housing to cover a sound emitting opening of the working unit or structure to inhibit sound from emanating from the housing, except at a first barrier opening;
    wherein the housing is elongate and includes first and second opposing housing ends;
    wherein the housing is constructed to withstand compressive forces;
    wherein the first barrier opening is positioned at one of the first and second opposing housing ends to facilitate a free exchange of gases;
    wherein the housing has a predefined length from the sound emitting opening in the working unit or structure to the first barrier opening;
    wherein inner surfaces of the housing are lined with at least one layer of sound absorbing material to absorb the sound emitted from the sound emitting opening as the sound travels the length of the barrier;
    wherein the housing is configured without a bottom housing part and, for positioning on the ground or other base surface;
    wherein both the ground or other base surface and the sound attenuating material act to absorb sound emitted from the sound emitting opening of the working unit or structure before same reaches one of the first and second barrier openings; and
    wherein a sound transmission class (STC) of the at least one layer of sound absorbing material, a sound absorption capability of the ground or other base surface and the predefined length from the sound emitting opening in the working unit or structure to the first barrier opening determine a level of the sound emitted from the barrier opening.

8. The rugged noise muffler system as set forth in claim 7, therein the housing is made of metal.

9. The rugged noise muffler system as set forth in claim 7, wherein the housing has a height of 8 or less inches from the ground.

10. The rugged noise muffler system as set forth in claim 7, wherein the housing has a second barrier opening for free exchange of gases at the other one of the first and second housing ends.

11. The rugged noise muffler system as set forth in claim 7, wherein, the barrier comprises a second housing to cover and absorb sound emanating from a second sound emitting opening in the working unit or structure.

12. The rugged noise muffler system as set forth in claim 7, wherein the other one of the first and second opposing housing ends is closed.

* * * * *